United States Patent Office 3,567,704
Patented Mar. 2, 1971

3,567,704
PEROXIDES VIA THE PHOTOSENSITIZED OXI-
DATION OF CERTAIN NAVAL STORES RAW
MATERIAL
Walter H. Schuller, 406 Oak Ave.; Jacob C. Minor, 10
Hillside Drive; and Ray V. Lawrence, 621 W. De Soto
St., all of Lake City, Fla. 32055
No Drawing. Filed Feb. 18, 1969, Ser. No. 800,284
Int. Cl. C09f 7/02
U.S. Cl. 260—97.5                              3 Claims

ABSTRACT OF THE DISCLOSURE

This invention relates to the photosensitized oxidation of certain naval stores raw materials. More particularly, this invention relates to the photosensitized oxidation of certain naval stores raw materials to give new peroxides useful as initiators for the polymerization of styrenated unsaturated polyester laminating resins.

A non-exclusive, irrevocable, royalty-free license in the invention herein described, throughout the world for all purposes of the United States Government, with the power to grant sublicenses for such purposes, is hereby granted to the Government of the United States of America.

An object of this invention is to provide new peroxides from certain naval stores raw materials. These peroxides prepared by the photosensitized oxidation of certain naval stores raw materials are useful as initiators for the polymerization of styrenated unsaturated polyester laminating resins.

Prior art processes are known for the photosensitized oxidation of levopimaric acid to give levopimaric acid transannular peroxide and the photosensitized oxidation of palustric acid to give palustric acid transannular peroxide (U.S. Pats. 2,996,515 and 3,230,235).

This invention relates to the photosensitized oxidation of certain naval stores raw materials to give new peroxides, useful among other things as initiators for the polymerization of styrenated unsaturated polyester laminating resins. A resin acid dimer has been photosensitized-oxidized in acetone to give a peroxidic product containing 0.21 mole of peroxide/mole of resin acid (or 0.42 mole of peroxide/mole of dimer). Wood rosin has been photosensitized-oxidized in methanol to give a peroxidic product containing 0.23 mole peroxide/mole of resin acid present. Tall oil rosin has been photosensitized-oxidized in methanol to give a peroxidic product containing 0.19 mole of peroxide/mole of resin acid. Tall oil fatty acids (4% rosin content) have been photosensitized oxidized in methanol to give a peroxidic product containing 0.38 mole peroxide/mole fatty acid. A mixture of tall oil fatty acids and tall oil rosin containing 26% rosin was photosensitized-oxidized to give a product containing 0.28 mole peroxide/mole resin acid. These products vary in composition and the structures of the peroxides are not previously known. However, they are known to be mixtures of peroxides which are useful as initiators for the polymerization of styrenated unsaturated polyester laminating resins.

The solvents employed in the photosensitized oxidation are generally ketones, such as acetone, and alcohols, such as, ethanol and methanol. The reactions are usually run at room temperature as the rate of the reaction depends chiefly upon the amount of light supplied to the reaction and not significantly upon the temperature. A variety of photosensitizing dyes can be used such as those described by Moore, Lawrence and Schuller (U.S. Patent 3,230,235, Jan. 18, 1966); e.g. rose bengal, eosin, and chlorophyll. The concentration of dye can be varied over wide limits. Some of the materials herein subject to photosensitized oxidation contain materials which react slowly with the dye and destroy it. In these cases, extra dye must be added during the photosensitized oxidation. In those cases where no dye is destroyed, a dye concentration of about 100 to 250 mg. per liter of solution is usually employed.

The concentration of the reactant in the solution can be varied over rather wide limits, e.g. from 1% to 20%. A concentration between 5% and 10% solids is usually employed.

The light source employed can be any source of visible light. Ordinary fluorescent light bulbs used in the lighting of laboratories are customarily employed. Any gas that contains free oxygen and is of itself inert under the conditions of the photochemical oxidation reaction can be used to carry out the process of this invention.

One feature of the present invention relates to the photosensitized oxidation of a resin acid dimer. This dimer is prepared by the use of a sulfuric acid or boron trifluoride catalyst. This resin acid dimer is of unknown structure and the peroxidic product is also of unknown structure. The peroxidic product is useful, however, as a free radical initiator. A possible structure postulated for the resin acid dimer in Hercules Incorporated trade literature is as follows:

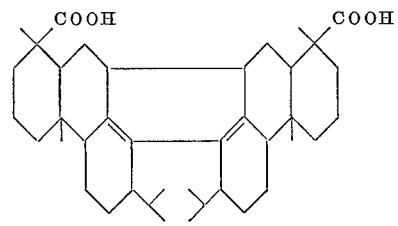

The transannular peroxide which would be expected to be formed from this would be as follows:

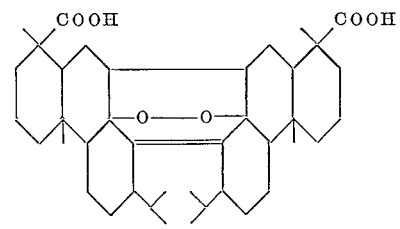

Another feature of this invention relates to the photosensitized oxidation of tall oil fatty acids (maximum rosin content 4%). These acids contain a considerable amount of unsaturation, some of which is conjugated unsaturation. Surprisingly, the photosensitized oxidation of these acids gave a peroxidic product with a relatively high peroxide content (0.38 mole peroxide per mole fatty acid).

This product was found to be useful as a free radical initiator.

Still another feature of this invention relates to the photosensitized oxidation of tall oil rosin. This product has the typical composition as described in the papers by D. E. Baldwin, V. M. Loeblich, and R. V. Lawrence, Ind. & Eng. Chem., 3, 342 (1958) and N. M. Joye, Jr. and R. V. Lawrence, J. Chem. Eng. Data, 12, 279 (1967). The peroxidic product is useful as a free radical initiator.

A further feature of this invention relates to the photosensitized oxidation of a middle cut from the sulfate process operation containing mostly tall oil fatty acids with about 26% rosin acids present. The peroxidic mixture obtained is useful as a free radical initiator.

Still a further feature of this invention relates to the photosensitized oxidation of wood rosin. The composition of a typical batch of wood rosin is also given in the two papers cited above. The peroxidic mixture is useful as a free radical initiator.

EXAMPLE 1

A rosin acid dimer is prepared from wood rosin in the conventional fashion using a sulfuric acid or boron trifluoride catalyst. The final product has an acid number of 135, color N (USDA rosin scale), saponification number of 145, average molecular weight 502, and softening point 152° C. A solution of 21 g. of this rosin acid dimer in 220 ml. of acetone containing 0.10 g. of rose bengal, is charged to a reactor described as follows. The apparatus consists of two Pyrex tubes mounted vertically, one inside the other. The outer tube (4.28 cm. inside diameter and 54 cm. in length) was fitted at its lower end with a sintered glass plate for $O_2$ gas input. The inner tube (3.48 cm. outside diameter and 55 cm. long) open only at its upper end, contained a 15-watt fluorescent tube (Westinghouse daylight). The reaction solution was charged to the outer tube so as to be illuminated from within. The solution was aerated and irradiated for 10 hours and then another 0.10 g. of rose bengal was added, as some bleaching of the dye occurs. After another 10 hours of aeration and irradiation the solution was titrated for peroxide, run 4 more hours, and titrated again. The peroxide content was constant, indicating the reaction to be over. The solution was passed through a column of a coarse grade of activated charcoal to remove the dye. It was then stripped under reduced pressure (bath temperature to 60° C.) to dryness and further dried over Drierite under reduced pressure to give a friable solid. Analysis of the product for peroxide indicated the presence of 0.21 mole peroxide/ mole of resin acid moiety or about 0.42 mole peroxide/ mole of resin acid dimer.

EXAMPLE 2

A solution of 25 g. of a typical sample of tall oil fatty acids (containing 4% rosin) in 250 ml. of methanol containing 0.10 g. of rose bengal was charged to the reactor described in Example 1. Aeration and irradiation was carried out for a total of 23 hours during which time titrations for peroxide content leveled off indicating the reaction to be over. Bleaching of the dye occurred during the run and 0.35 g. of rose bengal was added in four portions over the period of the run. The dye was removed and the product worked up as described in Example 1 to give a syrup containing 0.38 mole of peroxide per mole of fatty acid.

EXAMPLE 3

A solution of 26 g. of a mixture of tall oil fatty acids and tall oil rosin (26% rosin) in 260 ml. of methanol containing 0.10 g. of rose bengal was charged to the reactor described in Example 1 and aerated and irradiated for 22 hours. During this time titrations for peroxide leveled off showing the reaction to be complete. An additional 0.3 g. of rose bengal was added in 3 parts during the run because of the bleaching of the dye which occurred. The product was worked up as described in Example 1 giving a gummy solid of peroxide content 0.28 mole peroxide per mole of fatty acid.

EXAMPLE 4

A solution of 25 g. of tall oil rosin in 250 ml. of methanol containing 0.10 g. of rose bengal was charged to a reactor as described in Example 1. Aeration and irradiation is carried out for 18 hours at the end of which time the peroxide content had leveled off showing the reaction to be over. During this period 0.05 g. of rose bengal was added. The product was a friable solid with a peroxide content of 0.19 mole peroxide per mole of resin acid.

EXAMPLE 5

A solution of 26 g. of wood rosin in 260 ml. of methanol containing 0.10 g. of rose bengal was charged to the reactor described in Example 1. Aeration and irradiation was carried out for 19 hours at the end of which period the peroxide content had leveled off indicating the reaction to be over. During the run, 0.15 g. of rose bengal was added. The product was worked up as described in Example 1 and obtained as a friable solid with a peroxide content of 0.23 mole peroxide per mole of resin acid.

EXAMPLE 6

The various peroxides prepared in the preceding examples were tested as initiators for the polymerization of a styrenated unsaturated polyester laminating resin. This resin was made by reacting 1.75 moles of diethylene glycol with 1.0 mole of rosin followed by esterification with 3 moles of fumaric acid plus further diethylene glycol (stoichiometric amount added). To this unsaturated polyester is added 30 g. of styrene to 100 g. of ester. In each case, 5% by weight of the naval stores peroxide (0.50 g.) produced according to this invention was admixed with 10 g. of the styrenated unsaturated laminating resin and the mixture placed in an open beaker in a hot air oven at 130° C. A second beaker containing 10 g. of the styrenatedunsaturated polyester resin without catalyst was placed in the oven to serve as a control. The samples were observed periodically with the following results.

The peroxide from Example 1 made from a rosin dimer initiated the polymerization of the styrenated unsaturated polyester resin to give a tough polymer in 15 minutes. The control remained fluid and unchanged during this time.

The peroxide from Example 2 made from tall oil fatty acids initiated the polymerization of the styrenated unsaturated polyester to give a tough polymer in 21 minutes. The control remained fluid and unchanged during this time. At the end of 39 minutes the polymer is quite hard while the control still is fluid and unchanged.

The peroxide made in Example 3 initiated the polymerization of the styrenated ester to give a tough polymer in 20 minutes. At the end of 26 minutes the polymer had become quite hard. No change was observed in the control at the end of this time.

The peroxide made in Example 4 initiated the polymerization of the styrenated ester to give a soft gel in 45 minutes. No change was observed in the control, which remained fluid at the end of this time.

The peroxide made in Example 5 initiated the polymerization of the styrenated ester to give a hard, tough resin in 15 minutes. The control remained fluid with no visible change occurring at the end of this period.

We claim:

1. The peroxidized product obtained by passing an oxygen-containing gas through a solution of a substance selected from the group consisting of dimerized rosin and tall oil fatty acids containing 4% by weight of resin acids, said oxygen-containing gas being supplied at a rate sufficient to maintain an excess of free oxygen in the reaction mixture, said solution also having dissolved therein an amuont of photosensitizing dye sufficient to induce peroxidation while the reaction mixture is exposed to visible light.

2. The product of claim 1 wherein the substance which is peroxidized is dimerized rosin.

3. The product of claim 1 wherein the substance which is peroxidized is tall oil fatty acids containing 4% by weight of resin acids.

References Cited

UNITED STATES PATENTS

| 2,996,515 | 8/1961 | Moore et al. | 260—340.3 |
| 3,230,235 | 1/1966 | Moore et al. | 260—340.3 |

OTHER REFERENCES

Journal of the American Chemical Society, vol. 80, pp. 1438–1440 (1958).

Journal of the American Chemical Society, vol. 82, pp. 1734–1738 (1960).

Journal of the American Chemical Society, vol. 83, pp. 2563–2570 (1961).

I & EC Product Research & Development, vol. 3, pp. 97–100 (June 1964).

DONALD E. CZAJA, Primary Examiner

W. E. PARKER, Assistant Examiner

U.S. Cl. X.R.

161—231; 260—26, 99